United States Patent
Alfadhel et al.

(10) Patent No.: US 11,035,498 B2
(45) Date of Patent: Jun. 15, 2021

(54) CAPSULE, IN-LINE MAGNETIC VALVE SYSTEM AND METHOD

(71) Applicants: Ahmed Alfadhel, Rochester, NY (US); Meng-Chun Hsu, Scottsville, NY (US); David A. Borkholder, Canandaigua, NY (US)

(72) Inventors: Ahmed Alfadhel, Rochester, NY (US); Meng-Chun Hsu, Scottsville, NY (US); David A. Borkholder, Canandaigua, NY (US)

(73) Assignee: Rochester Institute of Technology, Rochester, NY (US)

( * ) Notice: Subject to any disclaimer, the term of this patent is extended or adjusted under 35 U.S.C. 154(b) by 531 days.

(21) Appl. No.: 15/829,565

(22) Filed: Dec. 1, 2017

(65) Prior Publication Data
US 2018/0156356 A1 Jun. 7, 2018

Related U.S. Application Data

(60) Provisional application No. 62/428,861, filed on Dec. 1, 2016.

(51) Int. Cl.
*F16K 99/00* (2006.01)
*B01L 3/00* (2006.01)
(Continued)

(52) U.S. Cl.
CPC .... *F16K 99/0053* (2013.01); *B01L 3/502738* (2013.01); *C01G 49/08* (2013.01);
(Continued)

(58) Field of Classification Search
CPC ......... Y10T 137/2213; Y10T 137/2191; Y10T 137/2082; F16K 99/0053; F16K 99/0021;
(Continued)

(56) References Cited

U.S. PATENT DOCUMENTS

| 4,825,939 A | 5/1989 | Salyer et al. |
| 6,415,821 B2 | 7/2002 | Kamholz et al. |

(Continued)

FOREIGN PATENT DOCUMENTS

| EP | 2554847 | 2/2013 |
| EP | 3048352 | 7/2016 |

OTHER PUBLICATIONS

Wikipedia "Reversing Valve" Jan. 23, 2016 p. 1-2, https://en.wikipedia.org/w/index.php?title=Reversing_valve&oldid=701279141 Printed Apr. 13, 2018.
(Continued)

*Primary Examiner* — Atif H Chaudry
(74) *Attorney, Agent, or Firm* — Bond, Schoeneck & King, PLLC; Joseph Noto

(57) ABSTRACT

A capsule is disclosed which includes a flexible outer shell capable of transforming into an asymmetric shape; an internal medium encapsulated by the outer shell, the medium including a plurality of magnetic particles, wherein the magnetic particles can move in response to an applied magnetic field. A valve system includes an in-line valve sized to fit within a flow channel including a capsule having a flexible outer shell containing an internal medium encapsulated by the outer shell, the medium including a plurality of magnetic particles; and a magnetic field source disposed about the exterior wall of the channel.

25 Claims, 14 Drawing Sheets

(51) Int. Cl.
  *H01F 1/00* (2006.01)
  *C01G 49/08* (2006.01)
  *H01F 1/44* (2006.01)

(52) U.S. Cl.
  CPC ...... *F16K 99/0019* (2013.01); *F16K 99/0021* (2013.01); *H01F 1/0018* (2013.01); *H01F 1/44* (2013.01); *B01L 3/5023* (2013.01); *B01L 3/5027* (2013.01); *B01L 2200/026* (2013.01); *B01L 2200/147* (2013.01); *B01L 2400/043* (2013.01); *B01L 2400/0672* (2013.01); *B01L 2400/0677* (2013.01); *Y10T 137/2082* (2015.04); *Y10T 137/2191* (2015.04); *Y10T 137/2213* (2015.04)

(58) Field of Classification Search
  CPC ............. F16K 99/0019; F16K 99/0051; F16K 99/0046; B01L 2400/0672
  See application file for complete search history.

(56) References Cited

U.S. PATENT DOCUMENTS

| | | |
|---|---|---|
| 7,290,555 B2 | 11/2007 | Koeneman et al. |
| 7,478,792 B2 | 1/2009 | Oh et al. |
| 8,235,073 B2 | 8/2012 | Namkoong et al. |
| 8,499,792 B2 | 8/2013 | Lee |
| 8,617,488 B2 | 12/2013 | Woudenberg |
| 2003/0012657 A1 | 1/2003 | Marr |
| 2009/0057587 A1 | 3/2009 | Heinrich et al. |
| 2012/0241017 A1 | 9/2012 | Lin et al. |
| 2012/0275929 A1 | 11/2012 | Salsman |
| 2013/0032235 A1 | 2/2013 | Johnstone et al. |
| 2014/0197345 A1 | 7/2014 | Graichen et al. |
| 2015/0202082 A1* | 7/2015 | Ilios .................. A61F 9/00781 604/9 |

OTHER PUBLICATIONS

International Search Report Form PCT/ISA/220, International Application No. PCT/US2017/064285 dated Apr. 5, 2018.
Hasselbrink et al. High-Pressure Microfluidic Control in Lab-on-a-Chip Devices Using Mobile Polymer Monoliths, Analytical Chemistry, 2002, pp. 4913-4918, vol. 74, No. 19.
Yanagisawa et al. Electromagnetically driven microvalve. Microsystem Technologies, 1995, pp. 22-25, vol. 2, No. 1.
Krusemark et al. Microball valve for fluidic micropumps and gases. Micro Total Analysis Systems '98, 1998, pp. 399-401.
Paschalis et al. A Novel Impantable Glaucoma Valve Using Ferrofluid. PLoS ONE, 2013, p. e67404, vol. 8, No. 6.
Rahbar et al. Design, fabrication and characterization of an arrayable all-polymer microfluidic valve employing highly magnetic rare-earth composite polymer. J. of Micromech. and Microeng. 2016, vol. 26, No. 5.
Tu et al. An in-channel micro check valve fabricated using a simple two mask process. IEEE Sensors, 2012.
Loverich et al. Single-step replicable microlludic check valve for rectifying and sensing low Reynolds number flow. Microfludics and Nanofluidics, 2007, vol. 3, No. 4.
Satarkar et al. Magnetic hydrogel nanocomposites as remote controlled microfluidic valves. Lab on a Chip, 2009, vol. 9.
Chen et al. Floating-Disk Parylene Microvalves for Self-Pressure-Regulating Flow Controls. J. Micro elec. mech. Sys. 2008, vol. 17.
Brunet et al. Reconfigurable Microfludic Magnetic Valve Arrays: Towards a Radiotherapy-Compatible Spheroid Culture Platform for the Combinatorial Screening of Cancer Therapies. Sensors, 2017, vol. 17.
Pugliese et al. In-plane cost-effective magnetically actuated valve for microfludic applications. Smart Mater. Struct. 2017, vol. 26.

* cited by examiner

CAPSULE, IN-LINE MAGNETIC VALVE SYSTEM AND METHOD

CROSS REFERENCE

This application claims the benefit of the filing date of U.S. Provisional Patent Application Ser. No. 62/428,861 filed Dec. 1, 2016, which is hereby incorporated by reference in its entirety.

This invention was made with government support under grant number R01 DC 014568 awarded by National Institute of Health. The government has certain rights in this invention.

FIELD

The present invention relates to a capsule, and in particular, a capsule for use in an in-line magnetic valve system.

BACKGROUND

Microfluidic systems have demonstrated great potential in a variety of applications, including biological detection, chemical analysis, fluidic manipulation, optical sensing, mechanical actuation, and drug delivery. Manipulating fluids in micro or nanoscale utilizing microtechnology has created new capabilities and improved effectiveness for the applications. Miniaturization of the systems, while successfully encompassing features and mechanisms, can achieve more precise control that opens up possibilities in low volume implantable drug delivery systems, Lab-on-Chip applications, and wearable flexible microfluidic systems.

Microvalves are essential microfluidic components for flow rectification, and to prevent microbial contamination of the drug delivery system caused by the backflow of body fluids. State-of-the-art valves can be classified into two major categories—active and passive, each with its own advantages and limitations. Active valves provide robust valve efficiency, but generally require external power to keep the valves in open/closed states. This power consumption adds size and weight that is undesirable in Lab-on-Chip, wearable, and implantable applications. Passive valves require no external power for actuation, relying on design features for flow rectification. A strong closing force and smooth valve/seat interface are required to create a diffusion barrier, resulting in large opening pressures for the valve.

Several key aspects for evaluating the passive valves include the ability to rectify flow, leakage, size, and complexity of fabrication. Passive valves are roughly categorized into two major actuation methods—mechanical and non-mechanical. Some common non-mechanical passive valves include diffuser-type valves and passive-capillary-effects-based valves created by geometries or surface properties (hydrophilic/hydrophobic). Diffuser-based passive valves performed poorly in preventing leakage due to the fact that the diffuser elements in the valve are always open. Capillary-based passive valves also face similar issues, as the microchannels are normally open, failing to block vapor from one side to another, resulting in contamination of fluids. Conventional passive mechanical valves based on cantilever-type flaps, membranes, or spherical balls, rely on the backpressure to seal the valve into the seat. These generally provide robust rectification to high backpressure, but suffer from poor performance at low backpressure where the valve is not completely closed. In general, mechanical passive valves suffer from leakage flows for applications with low operating pressures such as Lab-on-Chip, implantable microfluidic systems, and wearable technologies.

Paschalis et al. demonstrated a ferrofluid-based valve consisting of a silicone capillary tube, two permanent magnets, and $Fe_3O_4$/fluorocarbon-carrier-oil based ferrofluid. The ferrofluid droplet in the capillary tube was fixed in place by the primary magnet on one side of the tube, while a secondary magnet, placed on the opposite side, exerted magnetic force on the ferrofluid to form a capillary barrier as a valve that could be adjusted to open at different pressures based on the distance between the secondary magnet and the ferrofluid. However, the carrier fluid of the ferrofluid droplet was in direct contact of the fluid flow that passed by the valve and failed to provide a diffusion barrier.

SUMMARY

In accordance with one aspect of the present invention, there is provided a capsule including a flexible outer shell capable of transforming into an asymmetric shape; and an internal medium encapsulated by the outer shell, the medium including a plurality of magnetic particles, wherein the plurality of magnetic particles are capable of migrating within the medium in an applied external magnetic field to transform the outer shell.

In accordance with another aspect of the present disclosure, there is provided a valve system including an in-line valve, sized to fit within a flow channel, and including a flexible capsule capable of transforming into an asymmetric shape having a flexible outer shell containing an internal medium encapsulated by the outer shell, the medium including a plurality of magnetic particles; and a magnetic field source disposed about an exterior wall of the flow channel.

In accordance with another aspect of the present disclosure, there is provided a method for providing a valve system in a flow channel, including positioning at the entry to a flow channel a flexible capsule capable of transforming into an asymmetric shape having a flexible outer shell containing an internal medium encapsulated by the outer shell, the medium including a plurality of magnetic particles; moving the capsule to a desired location in the flow channel; and then locking the capsule in the desired location in the flow channel.

These and other aspects of the present disclosure will become apparent upon a review of the following detailed description and the claims appended thereto.

DETAILED DESCRIPTION

Figure 1A:
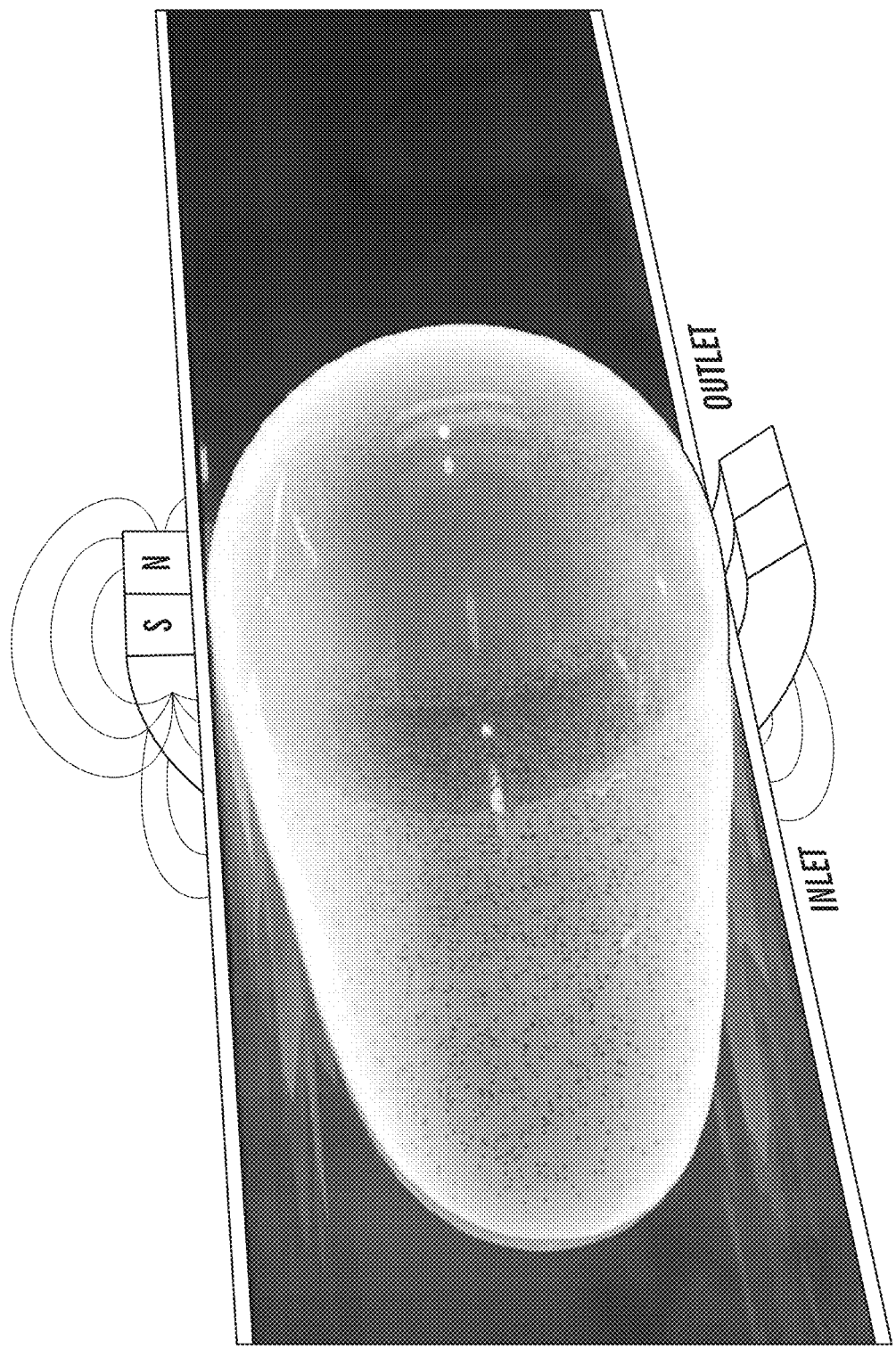
FIG. 1A is an illustration in accordance with an embodiment of the present invention of the in-line magnetic valve system that blocks diffusion and FIG. 1B is an illustration in accordance with an embodiment of the present invention of the in-line magnetic valve system shown in FIG. 1A allowing flow from the inlet side valve.

A capsule includes a flexible outer shell capable of transforming into an asymmetric shape; an internal medium encapsulated by the outer shell, the medium including a plurality of magnetic particles, wherein the magnetic particles can move in response to an applied magnetic field. In an embodiment, the magnetic particles can migrate in the medium. In an embodiment, the medium can transition between a solid phase and a liquid phase. In an embodiment, the medium can be a deformable solid. In an embodiment, the magnetic particles in a liquid medium can be immobilized or set free to migrate. In an embodiment, the distribution of magnetic particles is controlled in the manufacturing process eliminating the need for migration in the medium.

The capsule includes a flexible outer shell capable of transforming into an asymmetric shape. At least two dimensions of the capsule can change shape. One dimension is around the circumference that can be symmetric (e.g., circle) or asymmetric (e.g., rectangle). A second dimension along the length can be asymmetric. In an embodiment, the outer shell is water-impermeable. In an embodiment, the outer shell is selectively permeable allowing fluid to cross and equilibrate with an external fluid. Suitable outer shell materials include parylene-C and silicone materials, although other materials of suitable flexibility may be used.

The medium may be contained in the outer shell by polymer synthesis over the medium. In an embodiment, the medium is encapsulated using tubular microfluidic techniques where the liquid phase medium flows through a central channel while the polymer synthesis fluid flows through outer channel(s) to surround the medium. Control of relative flow rates provides control over the resulting dimensions of the capsule, while dwell time in the polymer synthesis fluid determines polymer shell thickness. In an embodiment, the solid phase medium of the desired capsule shape is placed in the polymer synthesis fluid, with dwell time determining polymer shell thickness.

The medium may be contained in the outer shell by encapsulating phase-change material molded in solid phase and can transition to the liquid phase during use of the valve. In an embodiment, the phase change material is thermally based, such as polyethylene-glycol (PEG) which has a tunable phase transition temperature based on the molecular weight, although other thermally based phase change materials can be used. Following capsule creation the phase-change material may be thermally degraded to permanently lower its phase transition point below an operating temperature of the capsule. In an embodiment, the phase change material is based on electrocrystallization, where electric fields are used to hold the medium in the solid phase, and removed during use to transition the medium to the liquid phase. Although other methods of phase transition can be used to control the liquid/solid state of the medium.

The medium may be contained in the outer shell by polymer deposition over the medium. In an embodiment, the medium is in the solid phase during polymer deposition. In an embodiment, the medium is in the liquid phase during polymer deposition. The polymer deposition may be a vacuum phase polymerization as done with Parylene. The polymer deposition may also be via spray coating or any other suitable method of applying a controllable thickness coating of polymer.

For embodiments where the outer shell is selectively permeable, the shell may be collapsed around the magnetic particles following outer shell creation by removal of the medium. In an embodiment, dehydration is used for medium removal. In an embodiment, sublimation removes the medium. Following collapse, the capsule can be inserted into a tube or microchannel with the medium reconstituted by fluid within the tubing or microchannel.

The medium contains magnetic particles including ferromagnetic (e.g., iron, cobalt or nickel), or superparamagnetic (e.g., $Fe_3O_4$) particles, although other materials with magnetic properties can also be used. In an embodiment, the particles include $Fe_3O_4$ with an average diameter of about 300 nm, although other diameters, both smaller and larger, can be used as long as they fit within the capsule. Suitable particle sizes include wherein a diameter of the particles is smaller than half the smallest cross-section of the capsule.

A valve system includes an in-line valve sized to fit within a flow channel including a capsule having a flexible outer shell containing an internal medium encapsulated by the outer shell, the medium including a plurality of magnetic particles; and a magnetic field source disposed about the exterior wall of the channel. In an embodiment, the flow channel is circular tubing. In an embodiment, the flow channel is a microchannel with rectangular or square cross-section. In an embodiment, the flow channel is a microchannel with semicircular cross-section. Although other cross-section shapes are also possible.

The magnetic field source is disposed about the wall of the channel. In an embodiment, the magnetic field source is a ring-shaped permanent magnet. In an embodiment, the magnetic field source is an electromagnet. In an embodiment, the magnetic field source is composed of multiple discrete magnetic field sources.

The magnetic field source is positioned at an outlet end of the flexible capsule capable of transforming into an asymmetric shape. In an embodiment, the distal edge of the magnetic field source is aligned with the distal edge of the capsule. In an embodiment, the distal edge of the magnetic field source extends beyond the distal edge of the capsule. In an embodiment the distal edge of the capsule slightly extends beyond the distal edge of the magnetic field source.

The magnetic field source provides a magnetic field gradient to attract the magnetic particles contained within the capsule. The magnetic particles are free to migrate within the capsule medium, and are concentrated at the outlet (magnetic field source) end of the capsule.

The magnetic particle attraction to the magnetic field source provides a force that pushes the capsule outer shell against the interior wall of the flow channel. This creates a sealing force between the capsule and flow channel walls at the outlet end of the valve.

The sealing force is adjusted based on the magnetic particle concentration, external magnetic field strength, and the flexibility of the capsule shell. All three parameters may be adjusted to provide a balance between opening force of the valve and diffusion blocking capabilities. For example, at least one of a low magnetic particle concentration, a low magnetic field strength, and a low flexibility capsule shell can provide a minimal seal with low opening pressure to forward flow, and low resistance to back flow. In contrast, a highly flexible shell coupled with at least one of high magnetic particle concentration and high magnetic field strength can provide a robust seal with higher opening pressures and much higher resistance to backflow. This configuration will also provide greater sealing against diffusion.

The capsule may be designed to expand during the liquid phase to enhance sealing of the valve to the channel walls. In an embodiment, the flow channel is a tube and the capsule is a cylinder formed with a PEG medium core. The capsule is inserted into the tube while the medium is in the solid state, and once in position is heated to induce a phase transition which also results in PEG expansion, pushing the flexible capsule wall against the flow channel interior wall. In an embodiment, the flow channel is a rectangular microchannel with a capsule formed with a matching rectangular cross-section with a PEG medium core.

An inlet side of the capsule is free to move in response to a fluid (liquid or gas) flow. The magnetic field source positioned at the outlet side of the capsule attracts nanoparticles contained within the capsule, concentrating them at the outlet end and expanding the capsule at the outlet end. The inlet side of the capsule has no or effectively few magnetic field forces to counter fluid flow forces, enabling the inlet side of the capsule to move and deform.

The opening pressure of the valve can be controlled by the combination of magnetic particle concentration, magnetic field strength, shell flexibility, and capsule aspect ratio. In an embodiment, at least one of a high magnetic particle concentration, high magnetic field strength, and high flexibility shell are used to yield high opening pressures. Reducing the length to diameter aspect ratio of the capsule can further increase the opening pressure. In an embodiment, at least one of a low magnetic particle concentration, low magnetic field strength, and a low flexibility shell are used to yield a low opening pressure for the valve. Increasing the length to diameter aspect ratio of the capsule can further reduce the opening pressure. In an embodiment, the width of the magnetic field source is increased to increase opening pressure and decreased to decrease opening pressure. This can be done with sizing of a permanent magnet, or dynamically with multiple electromagnets.

The valve system includes a flow rectifier. Fluid force from the inlet side can deform the capsule to create forces countering the magnetic particle forces at the outlet end of the channel. Hence, flow forces from the inlet side can result in cross-valve flow of fluid within the channel. Fluid forces from the outlet side act on the end of the capsule and are unable to counter magnetic particle forces. The capsule shell remains sealed to the flow channel wall to block flow.

When flow rectification is not desired, the magnetic field source can be positioned in the middle of the capsule. With the magnetic field source in the middle of the capsule, the magnetic particles exert a force on the flexible capsule wall creating a sealing force at the middle of the capsule. This results in equivalent opening pressure from either the inlet or outlet, since the capsule shape and forces are symmetric from inlet and outlet sides. This embodiment can provide diffusion blocking capabilities, but will enable flow in either forward or reverse directions depending on the applied pressure or fluid flow direction.

A method for creating a capsule in accordance with an embodiment of the present invention, includes preparing a mixture of a medium with the magnetic particles, transitioning the medium to a solid phase within a mold to control the shape, and coating the solid medium/magnetic particle composite with a flexible shell material. In an embodiment, the medium is polyethylene-glycol (PEG) and magnetic particles are $Fe_3O_4$ nanoparticles, with temperature used to control the phase of the medium and tubing serving as a mold. The PEG composite is injected into the tubing in the liquid phase, the temperature is dropped to solidify the medium and the medium is ejected from the tubing mold. Following mechanical separation to the desired length, each segment is coated with Parylene in a vapor deposition system to form the capsule. In an embodiment, microchannels are used as a mold for the medium. In an embodiment, individual molded cavities provide fixed dimensions for the capsule without mechanical separation. Although other mediums, magnetic particles, mold systems, and mechanical separation methods may be used.

A method for providing a capsule in a flow channel, includes positioning the capsule at the entry to the flow channel, moving the capsule to the desired location, and then locking in place. In an embodiment, the capsule is guided to the desired location with externally applied magnetic fields. In an embodiment, fluid flow is used to position the capsule. In an embodiment, air flow is used to position the capsule. In an embodiment, the capsule is placed in a microchannel before the channel cap is installed. The capsule medium may be in the solid phase during positioning. In an embodiment, temperature is used to hold the medium in the solid phase during positioning and then temperature is elevated to induce a phase transition and associated expansion to lock the capsule in place. In an embodiment, the capsule is positioned with the medium in either a solid or liquid state, and it is locked in place with an external magnetic field source. The magnetic field source may be a permanent ring magnet positioned around the flow channel. In an embodiment, the magnetic field source is discrete magnets positioned around the flow channel. In an embodiment, a coil of wire wrapped around the flow channel can be used as an electromagnet. In an embodiment, a physical feature or restriction within the flow channel locks the capsule in place.

A magnetic nanocomposite microcapsule functions as an in-line valve that can be integrated with micropumps and microfluidics. The valve provides efficient flow rectification at low pressures, and a robust diffusion barrier while retaining ultra-low opening pressures. The scalable valve is based on the deformation of magnetically responsive soft microcapsules with a liquid magnetic nanocomposite acting as the core, and soft impermeable polymer as the shell. The shell provides enclosure, flexibility, and a barrier between the nanocomposite and the fluid flow. The valve demonstrates effective flow rectification capabilities, low reverse leakage flows at low pressure, diffusion blocking capabilities, and simplicities in integration into microfluidic systems. Moreover, the fabrication processes can be easily customized to accommodate a wide range of microfluidic systems.

Figure 1B:
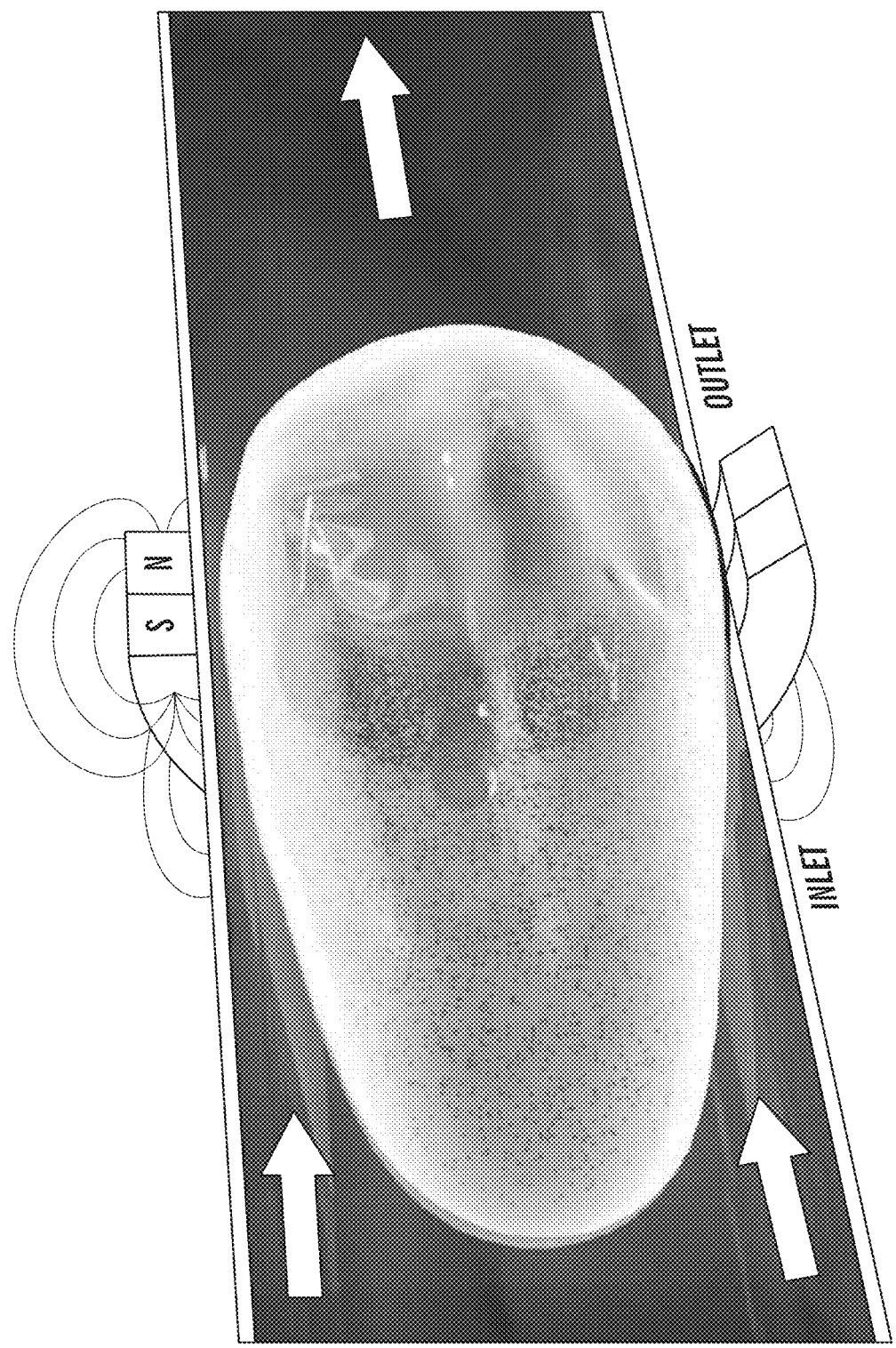
Figure 2A:
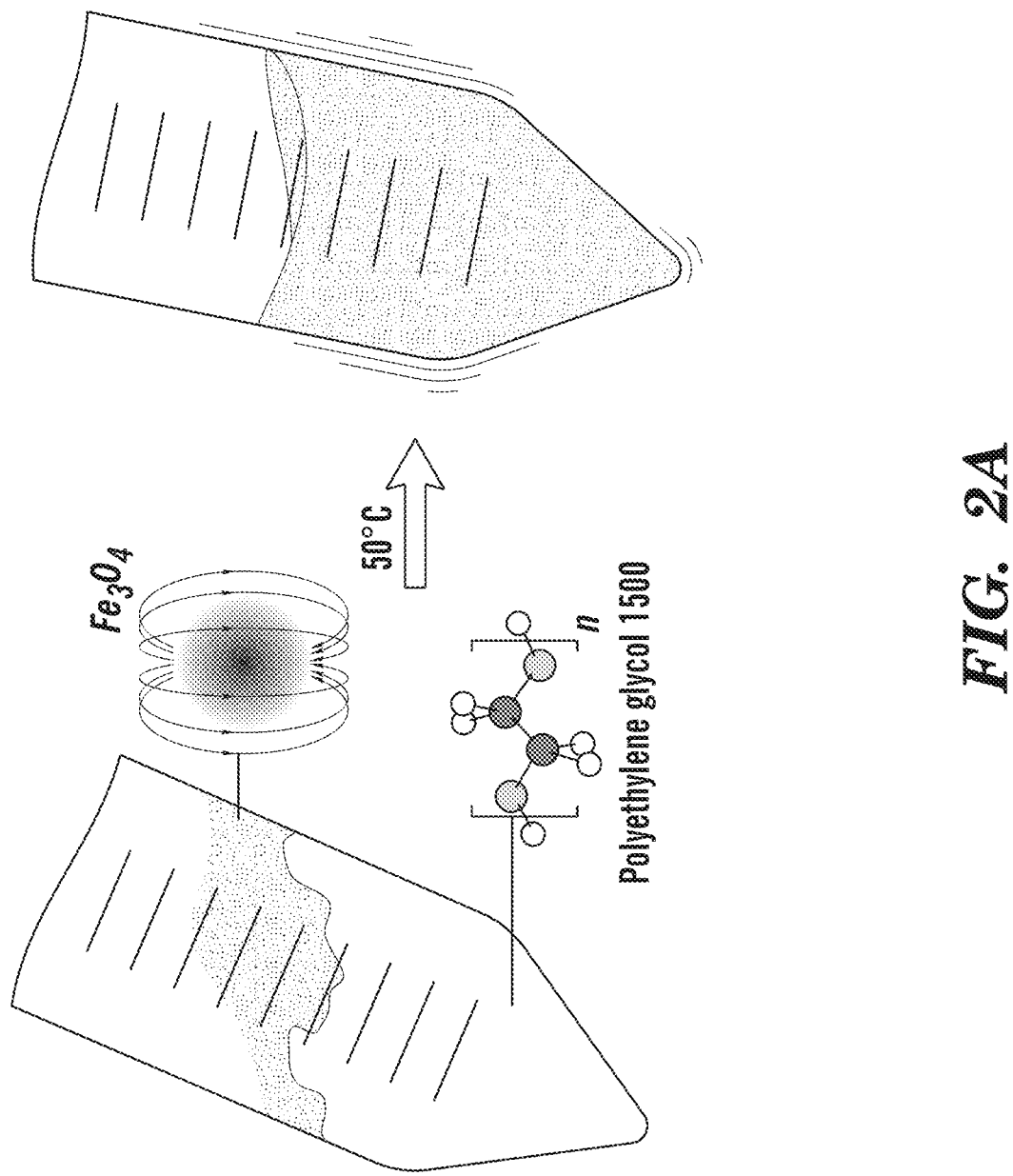
FIG. 2A is an illustration of the fabrication of a magnetic nanocomposite.
Figure 2B:
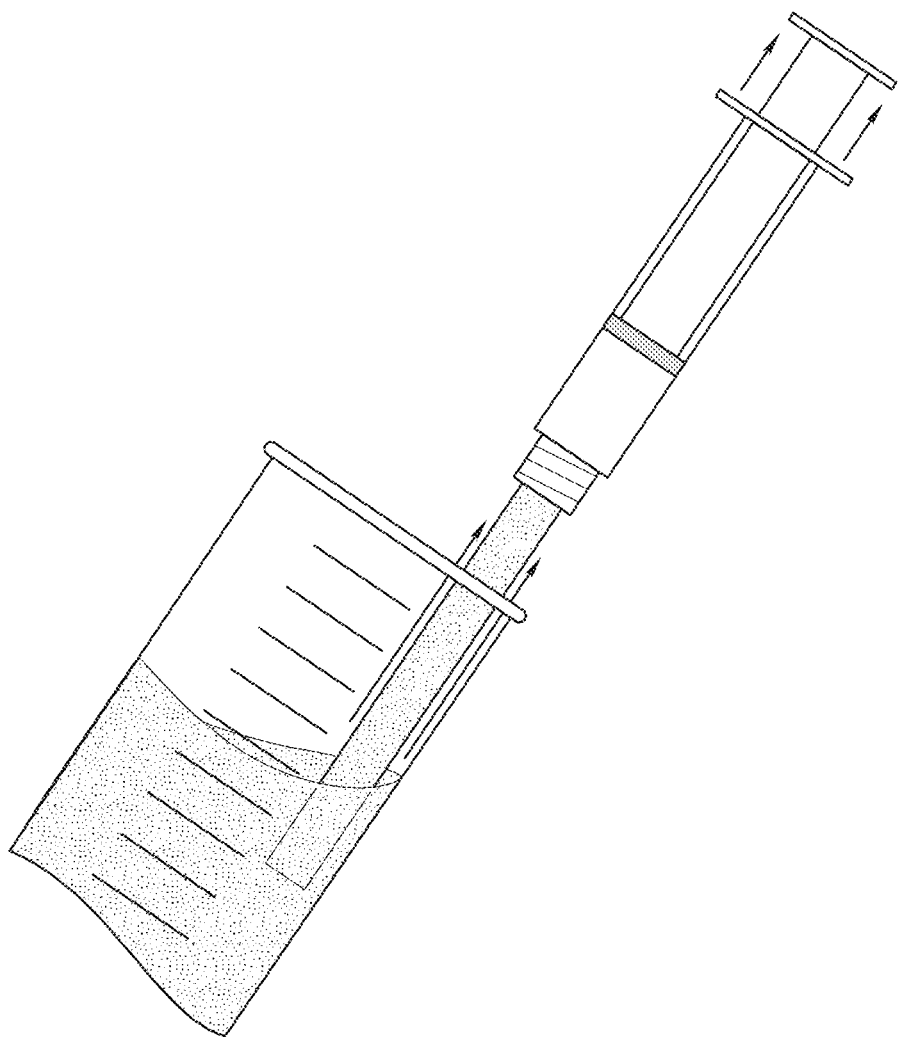
FIG. 2B is an illustration of the magnetic nanocomposite transfer to a tubing mold.
Figure 2C:
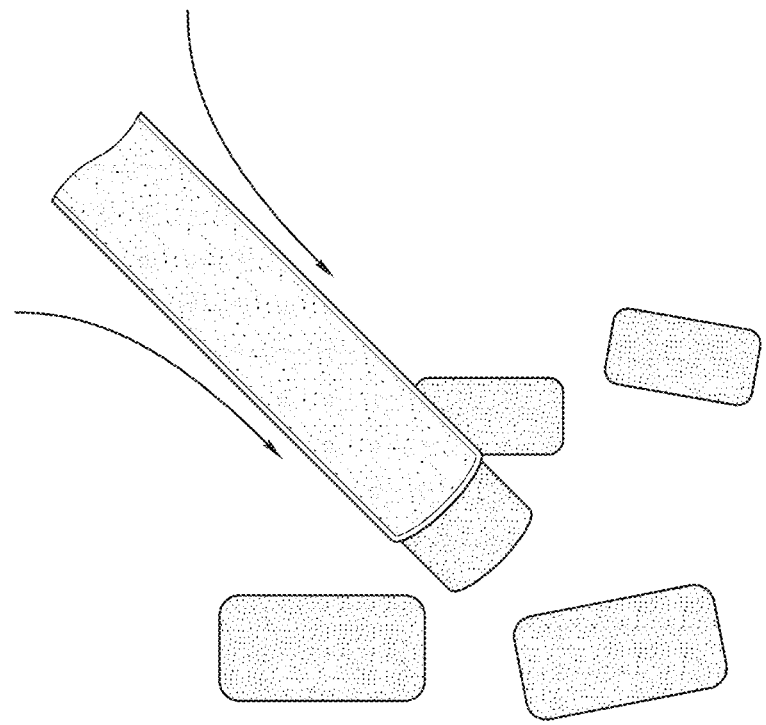
FIG. 2C is an illustration of fabricating the molded magnetic nanocomposites to desired lengths.
Figure 2D:
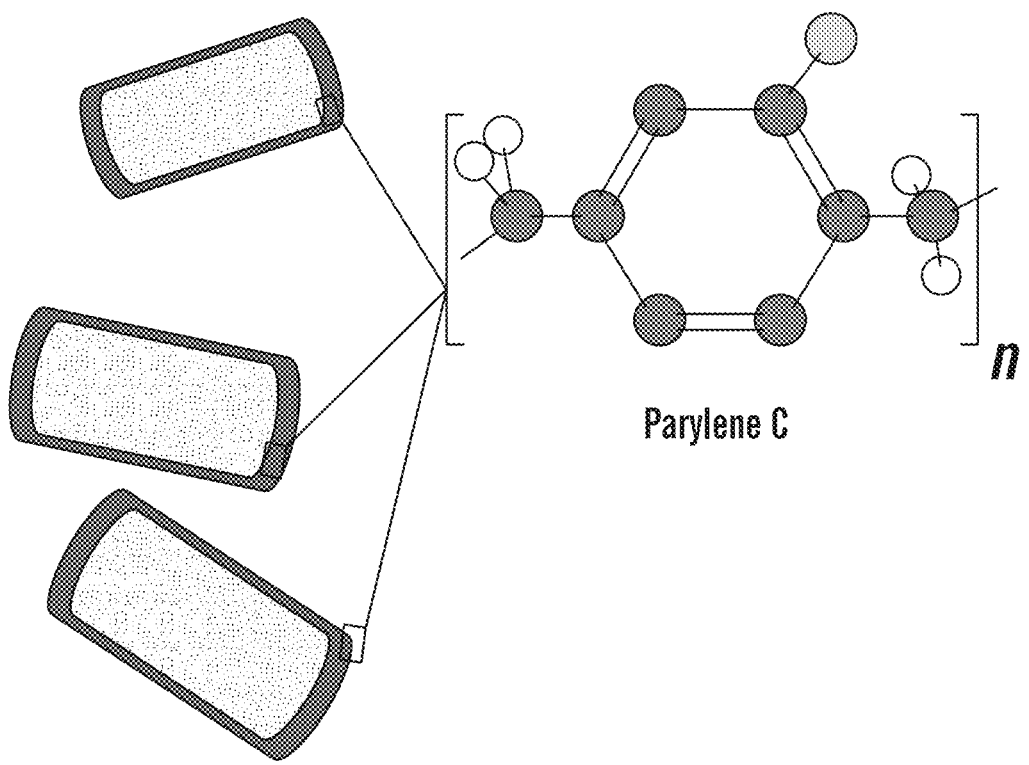
FIG. 2D is an encapsulation of the magnetic nanocomposites.
Figure 2E:
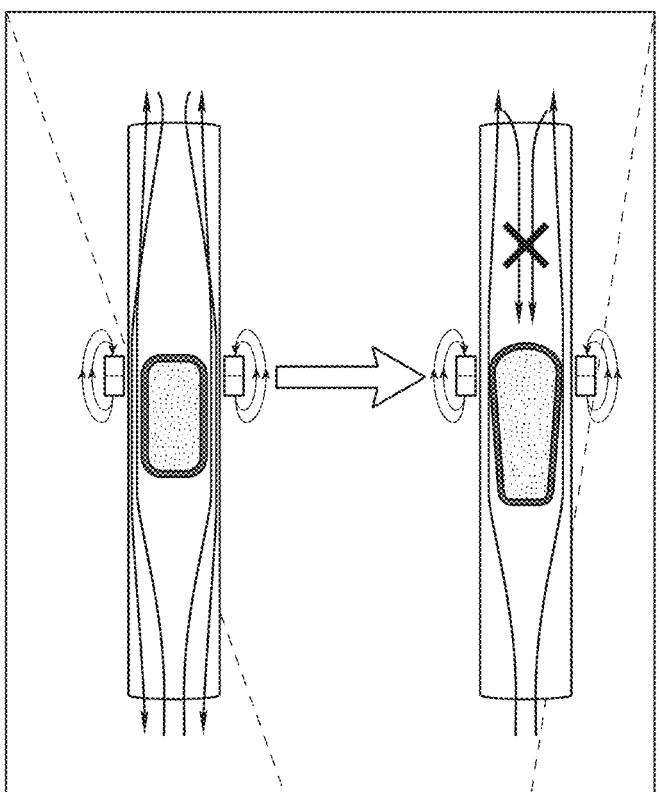
FIG. 2E is an illustration of the magnetic microcapsules steered to a desired location, locked in place and heated, in accordance with an embodiment of a fabrication process of the system of the present invention.
Figure 2E:
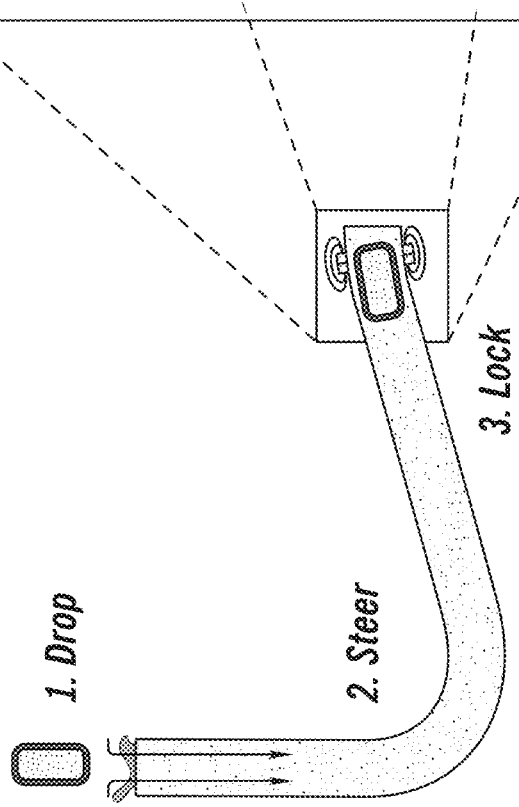

A 3D illustration of the capsule and in-line magnetic valve system is shown in FIG. 1. FIG. 1A is a 3D illustration of the valve with a magnetic field gradient source applied at the outlet end, creating a contact force between the microcapsule and the channel wall that blocks diffusion. FIG. 1B is a 3D illustration of the valve allowing flow from the inlet side.

The disclosure will be further illustrated with reference to the following specific examples. It is understood that these examples are given by way of illustration and are not meant to limit the disclosure or the claims to follow.

Example 1—Biocompatible Magnetic Nanocomposite Microcapsules as Highly Customizable Microfluidic One-Way Diffusion Blocking Valves A one-of-a-kind passive and biocompatible valve was developed. The in-line and scalable design is based on a microcapsule with a core of magnetic nanocomposite encapsulated with a soft polymeric impermeable shell. The microcapsule with the magnetic field gradient source demonstrates flow-rectifying capabilities along with an ultra-low forward-flow opening pressure. The forward-to-backward flow ratio was measured to be 71.4 at 14 kPa for valves based on 4 mm long microcapsules with concentration of 75% wt/wt $Fe_3O_4$: PEG. The valve's forward-flow opening pressure was measured to be an astonishingly low 2.1 kPa, allowing microfluidic devices to easily actuate flows in the desired direction. The valve also successfully blocked 99.96% of diffusion, one of the major unsolved problems for passive microvalves, making contamination-free microfluidic applications possible. The magnetic-nanocomposite-core microcapsule may have utility in a variety of microfluidic channels to achieve robust flow rectification for precise flow control and diffusion blocking for contamination prevention.

The valve system includes a microcapsule and a magnetic field gradient source. The core of the microcapsule was a biocompatible magnetic nanocomposite consisting of PEG with molecular weight of 1500 and $Fe_3O_4$ nanoparticles, commonly used for biocompatible applications. $Fe_3O_4$ nanoparticles with an average diameter of 300 nm were selected for their high magnetization capabilities. PEG 1500 was selected for its phase-change characteristics, providing a solidified core at room temperature during fabrication, while melting at a relatively low temperature of 44-47° C. Sustained heating of PEG 1500 in polymer thermal degradation that involves breakdown of the molecular chains, leading to a lower melting temperature. Experimentally we have experienced reduction of the melting temperature to below room temperature, yielding a liquid-phase nanocomposite valve after 72 hours of heating. Parylene-C is selected as the encapsulation material due to its flexibility, stretchability, and the role as a gas and liquid barrier. The concept can be realized for a wide range of geometry designs, materials, and dimensions of microfluidic channels. In this work, commercial fluorinated ethylene propylene (FEP) tubing with an inner diameter (ID) of 794 µm and 1.59 mm outer diameter (OD) was selected to demonstrate the capability of this concept. A 1.32 T N42 axially magnetized NdFeB ring magnet (K&J Magnetics ⅛" OD×1/16" ID×1/16" thickness) was used to provide the magnetic field gradient required to seal the valve at one end.

The fabrication process of the valve is illustrated in FIG. 2. Nanocomposites were prepared through incorporating $Fe_3O_4$ nanoparticles (300 nm by Alpha Chemicals) into molten PEG with concentrations of 50%, and 75% $Fe_3O_4$: PEG weight-to-weight ratio. A heated ultrasonication bath ensured proper mixing and broke down agglomerates. FEP tubing with 750 µm inner diameter served as the mold of the nanocomposite. The nanocomposite within the FEP tubing mold was placed in vacuum (10 torr) to eliminate trapped air cavities, and was cooled down to solidify the PEG. The resulting ingot was pushed out of the tube and manually cut into microcapsule cores with the desired lengths (i.e., 1-4 mm). The microcapsule cores were then encapsulated by ~2 µm Parylene-C (Specialty Coating Systems, Indianapolis, Ind.) using a customized magnetic rotating stage to turn the microcapsules during deposition and achieve a uniform coating using a custom built Parylene deposition tool. Using magnetic tweezers, the microcapsule was dropped into the target fluidic channel, in this work, 794 µm-inner-diameter FEP tubing. The microcapsule was steered to the desired location in the FEP tubing with pressurized deionized water. A N42 axially magnetized NdFeB ring magnet was used over the FEP tubing to lock the Parylene-C coated nanocomposite from one end, and provide the magnetic field gradient required for operation. After locked in place, the microcapsule was heated to melt the nanocomposite allowing the nanoparticles to be attracted to the magnet and agglomerate at the edge forming a sealing point. Short term heating at 75° C. for 72 hours thermally degraded the PEG polymer, lowering the melting temperature to below room temperature.

FIG. 2 is an illustration of the fabrication process. FIG. 2A shows the magnetic nanocomposite fabricated by incorporating $Fe_3O_4$ nanoparticles into molten PEG. FIG. 2B shows the magnetic nanocomposite transferred to the FEP tubing mold and cooled under vacuum. FIG. 2C shows the magnetic nanocomposites fabricated with desired lengths. FIG. 2D shows encapsulation of the magnetic nanocomposites with Parylene-C to form magnetic microcapsules. FIG. 2E shows the magnetic microcapsules were steered to desired location, locked in place with a ring magnet, and heated for PEG thermal degradation to maintain the core in liquid phase.

A scanning electron microscope (SEM) was utilized to investigate the Parylene-C encapsulation quality and to image the microcapsules as fabricated and after operation. The concentration of the nanocomposites and the effect of nanoparticles migration toward the magnetic field source were investigated by obtaining the magnetic properties using the vibrating sample magnetometer (VSM). The amount of nanoparticles affect the magnetic force applied on the microcapsule shell, and hence affects the valve performance.

Valve performance was tested in a flow rate verses applied pressure experiment using dyed deionized water throughout the FEP tubing. Regulated pressures were applied from the inlet side and then repeated from the outlet side with recording of the travel distance of the dyed water over time to determine the flow rate. The opening pressure and flow rectification performance were studied as a function of magnetic nanoparticle concentration in the nanocomposite.

To test the valve's diffusion blocking efficiency, a fluorescein sodium salt solution of 1 mg/ml in deionized water was carefully injected into the hole drilled on the tubing at the outlet end of the valve. The diffusion was observed by recording the fluorescence intensity variation over time at the inlet and the outlet ends of the valve using a fluorescence microscope (LEICA DM 2500) at 515 nm emitting wavelength. The fluorescence intensity of the inlet end of the valve was normalized by the intensity measured at the outlet side at the same time. The diffusion test without the valve was performed similarly; however, a 4 mm air gap was kept between the injected hole of fluorescein solution and the inlet measurement spot. The gap was filled with deionized water using a 34 G syringe tip inserted from the inlet side of the tubing right before the fluorescence intensity measurements to avoid the capillary effects and ensure the time origin of the contact between the fluorescein solution and deionized water. The fluorescence intensities of the inlet and outlet measurements spots were recorded instead of the inlet and outlet ends of the valve. The designated inlet measurements of intensities were normalized by the outlet measurements at the same time.

Figure 3:
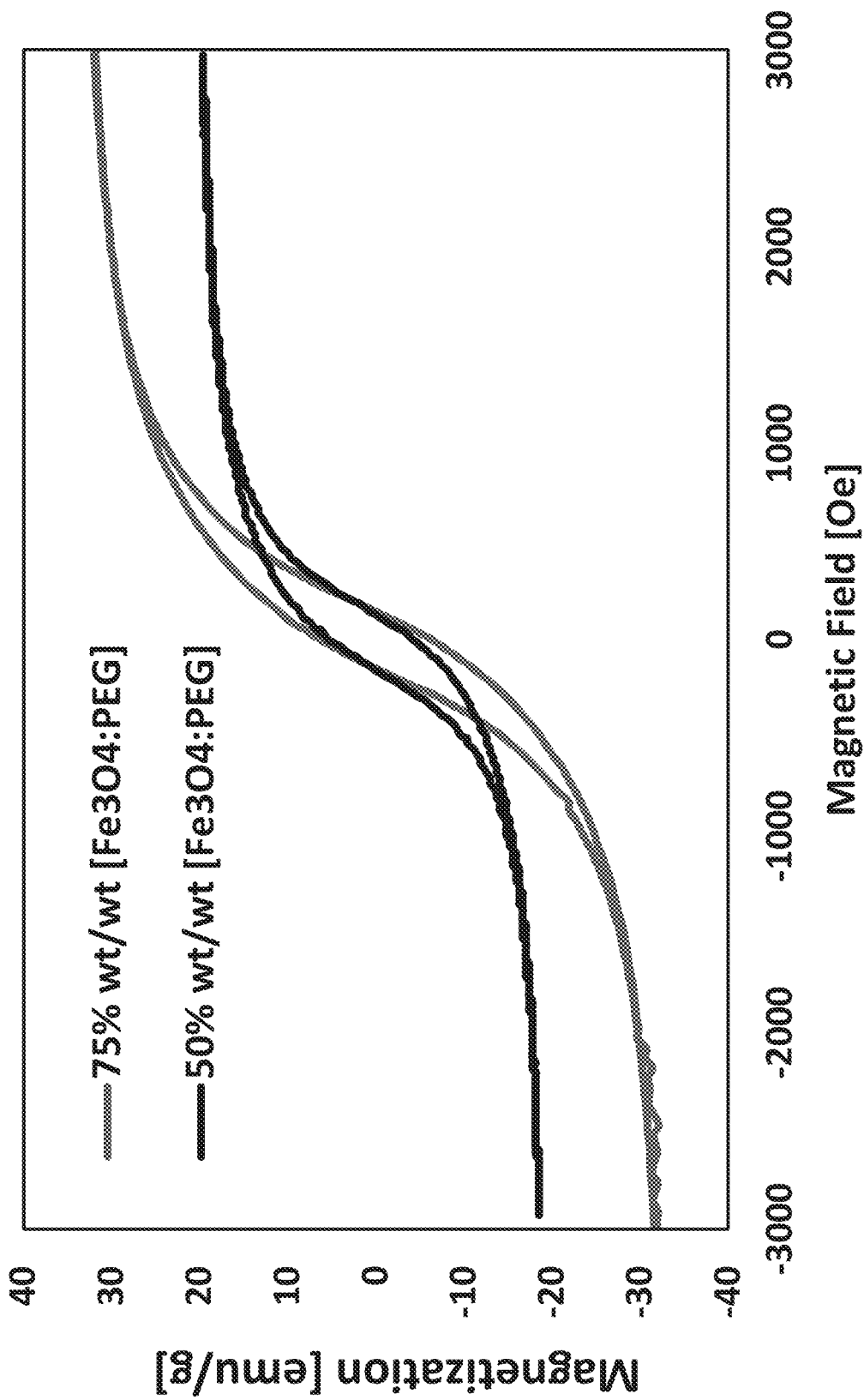
FIG. 3 is a graph of magnetization curves for nanocomposites prepared in accordance with an embodiment of the present invention.

Magnetization of the nanocomposite core in the microcapsule plays a key role in the magnetic attraction force that provides the seal of the valve, and controls the opening pressure as well as the operating range. To confirm the uniformity of magnetic nanocomposite from the fabrication process, VSM was utilized to characterize the magnetization of the microcapsules. Magnetization measurements are provided in FIG. 3, showing a concentration dependent magnetization of 19 emu/g and 33.2 emu/g for valves fabricated with concentrations of 50%, and 75% wt/wt $Fe_3O_4$: PEG. The vibrating sample magnetometer can also be utilized to confirm a key hypothetical mechanism—$Fe_3O_4$ nanoparticles can be attracted and travel freely to the magnetic field source to provide the sealing of the valve. In order to characterize the magnetization distribution inside the microcapsule and determine the maximum microcapsule length, microcapsules were cut into 1 mm long segments for magnetization characterization immediately after fabrication and after use. A fixed concentration of 75% wt-wt $Fe_3O_4$: PEG was used for devices of length 2 mm, 4 mm, and 5 mm. As fabricated microcapsules were retained at room temperature in their solid phase, cut, and analyzed. For analysis after use, microcapsules were inserted into the 794 μm ID FEP tubing and locked in place with the ring magnet as previously described. Following thermal degradation, the microcapsules were cooled to room temperature and then frozen in liquid nitrogen to ensure full solidification prior to cutting and VSM analysis. Magnetizations for each segment are shown in FIG. 4 with as fabricated samples exhibiting uniform distribution of the nanoparticles. Following use, there is a clear gradient of magnetization; low at the inlet side and peaking at the outlet side of the microcapsule demonstrating $Fe_3O_4$ nanoparticle migration toward the magnetic source while PEG is in the liquid phase. The shortest valve (2 mm-long) yielded a lower peak magnetization than the 4 mm-long and 5 mm-long valves, suggesting insufficient nanoparticle density. The 5 mm-long valve exhibited non-zero magnetization at the inlet side suggesting insufficient magnetic field strength at this distance from the magnet. For this configuration with a tubing, ID of 794 μm and the selected N42 axially magnetized NdFeB ring magnet, the optimal valve length is 4 mm.

FIG. 3 shows magnetization curves for nanocomposites with concentration of 50%, and 75% wt/wt $Fe_3O_4$:PEG characterized using vibrating sample magnetometer.

Figures 4A, 4B, 4C:
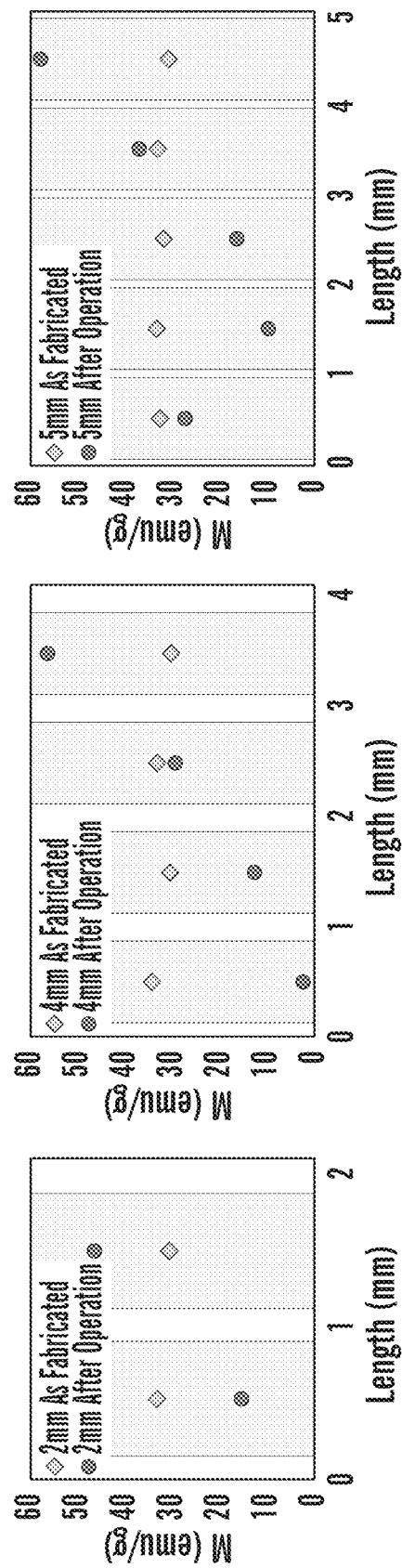
FIG. 4A is a graph of magnetization distributions for microcapsules verses length of 2 mm.
FIG. 4B is a graph of magnetization distributions for microcapsules verses length of 4 mm.
FIG. 4C is a graph of magnetization distributions for microcapsules verses length of 5 mm.

FIG. 4 shows magnetization distributions for microcapsules as fabricated and after operation with lengths of 2 mm (FIG. 4A), 4 mm (FIG. 4B), and 5 mm (FIG. 4C).

Figure 5A:
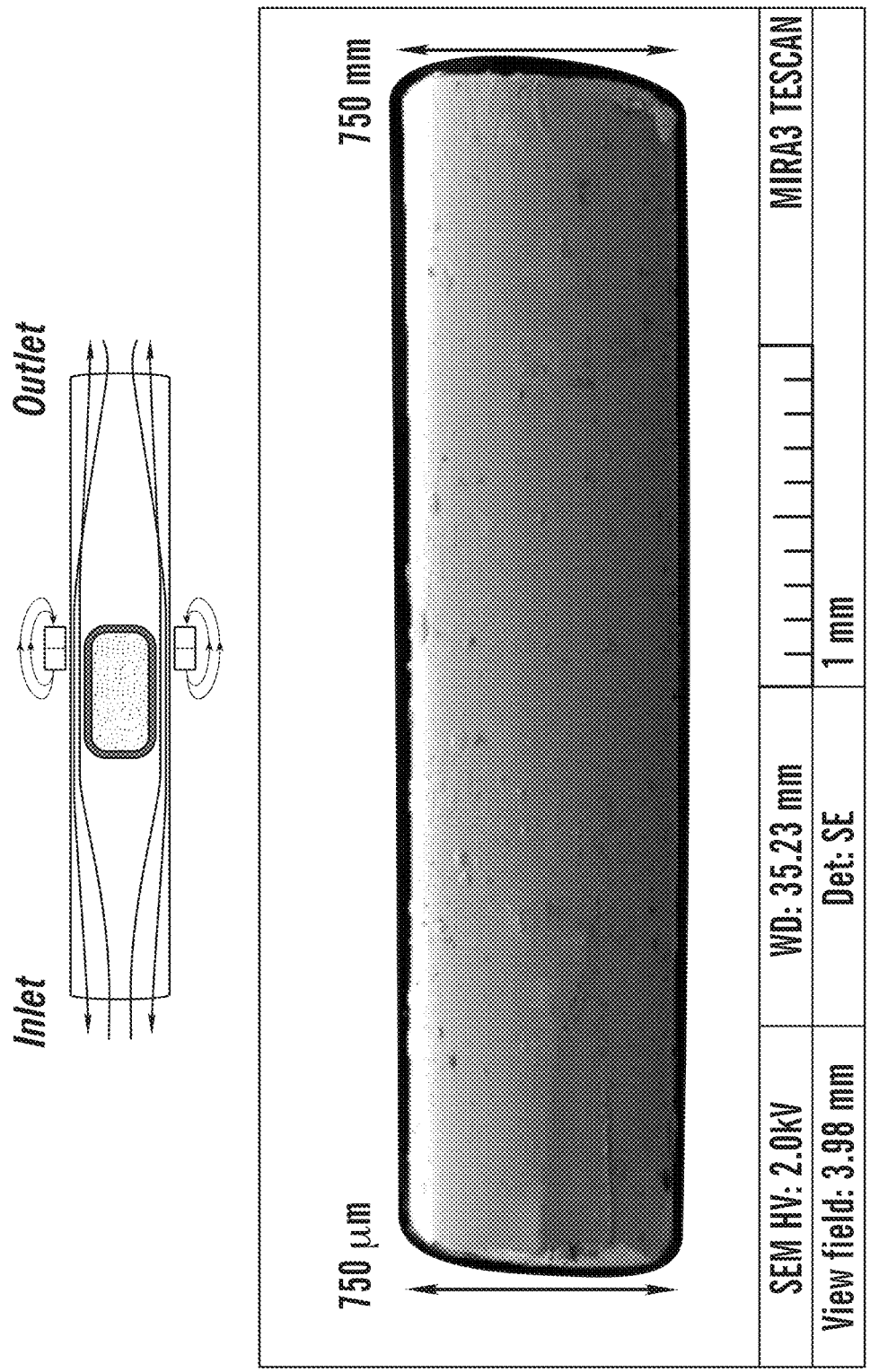
FIG. 5A is an SEM image and representation of a valve as fabricated and FIG. 5B is an SEM image and representation of a valve following operation of a magnetic field source and heating to induce a phase transition of the medium.
Figure 5B:
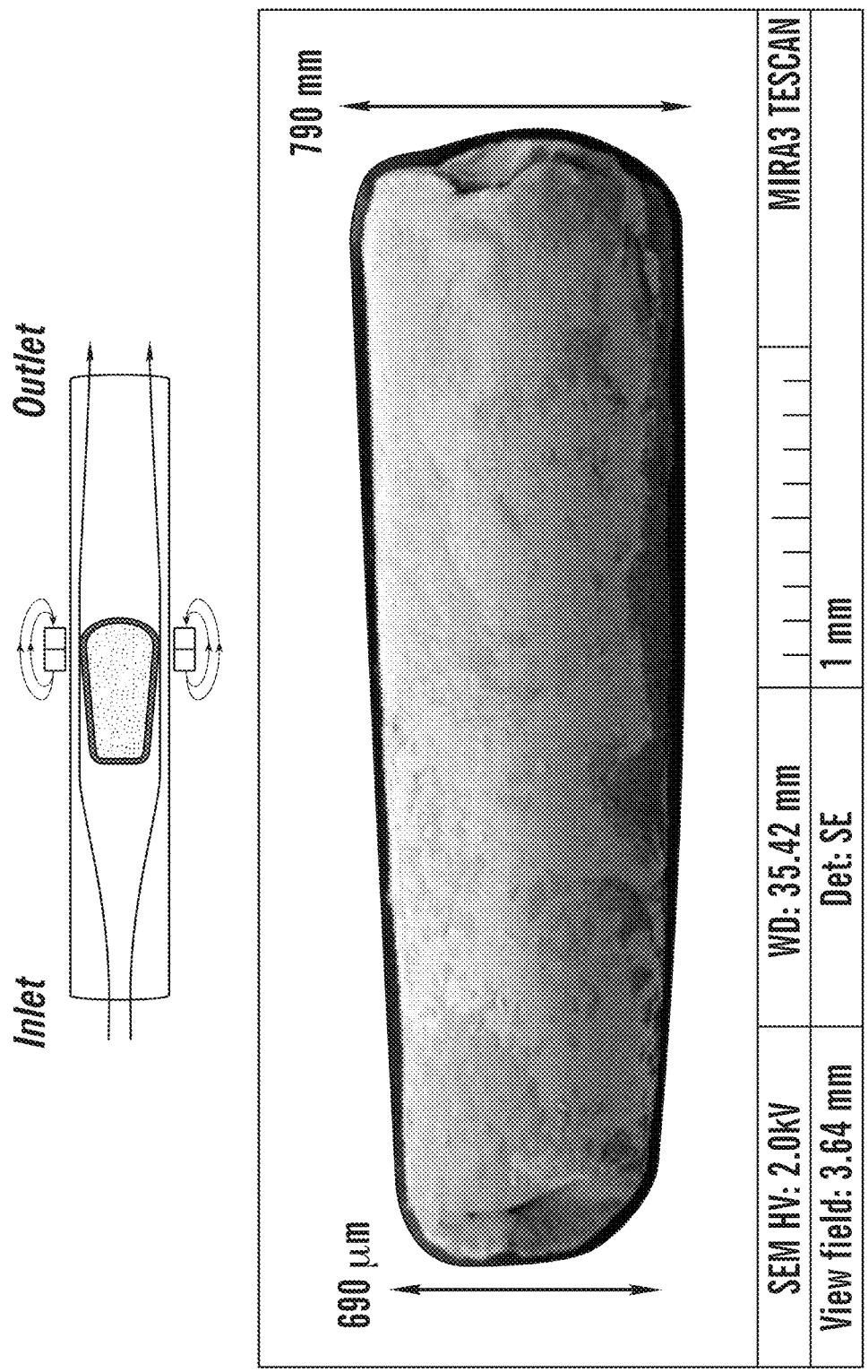

The shape and morphology of the microcapsules were studied through SEM imaging. FIG. 5 shows geometries of the valve (FIG. 5A) as fabricated (FIG. 5B) following operation with a magnetic field source (PEG in liquid phase) and re-solidification for removal and image analysis. FIG. 5A shows the fabricated cylindrical shape microcapsule in its solid state. The image shows the uniformity of the Parylene encapsulation and the consistent diameter of 750 μm. When inserted into the fluidic channel, the solid microcapsule will add fluid resistance but will not act as a valve. As the microcapsule is heated within the fluidic channel, in the presence of the magnetic field source, the geometry changes to provide the valve function. FIG. 5B shows the geometry change of the microcapsule, with the outlet side expanding under the force of the magnetic nanoparticles while the inlet side narrows. Texture variation is due to shrinkage of the operated microcapsule after re-solidification (a process that is not done in normal use); microcapsule dimensions are not representative of the actual dimensions in use.

Figure 6A:
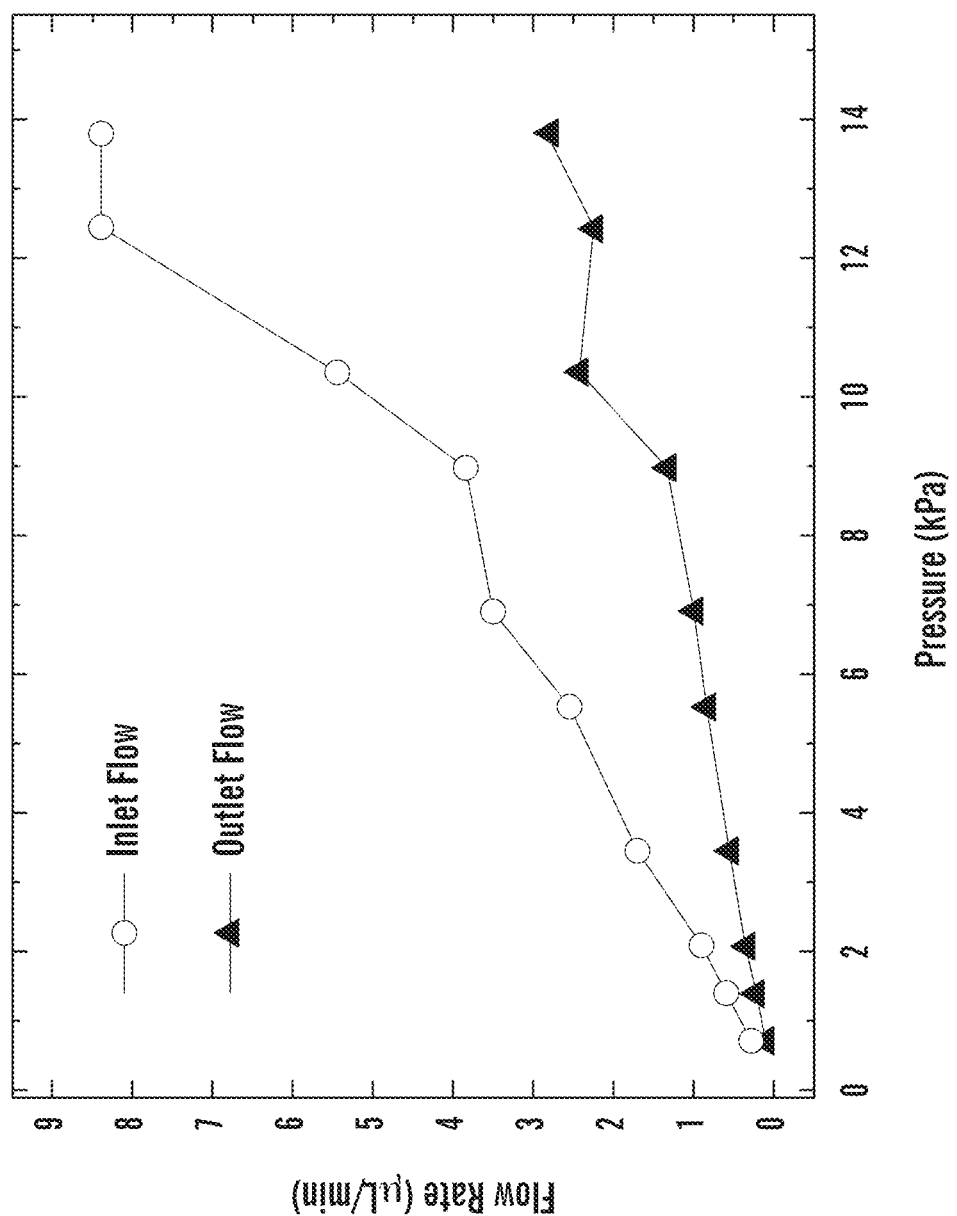
FIG. 6A is a graph of flow rate verses pressure for 50% wt/wt $Fe_3O_4$: PEG microcapsules
Figure 6B:
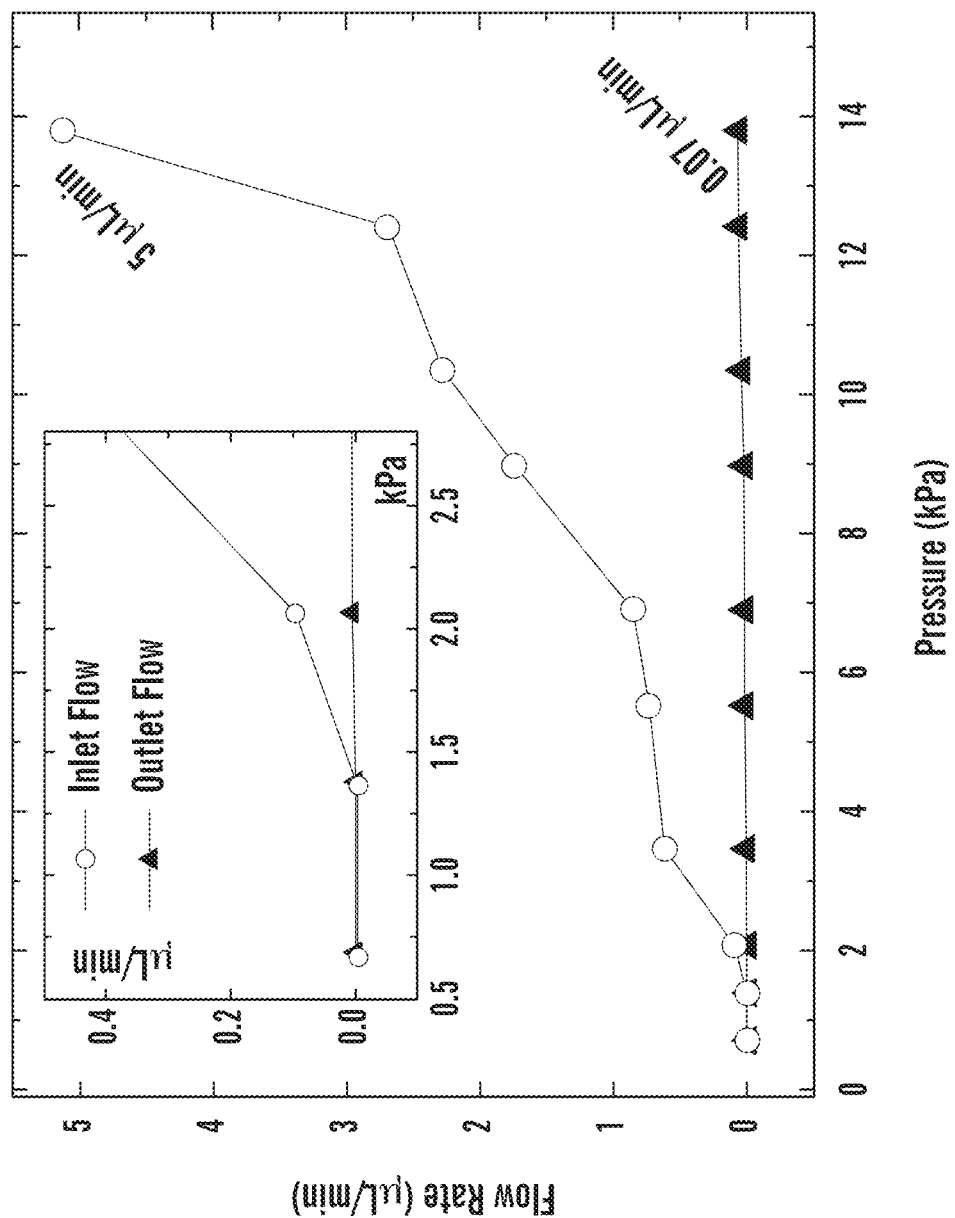
FIG. 6B is a graph of flow rate verses pressure for 75% wt/wt $Fe_3O_4$: PEG microcapsules.

Flow rectification and leakage pressure are important parameters for valve efficiency. Flow rate verses pressure tests were conducted for 4 mm-long 50%, and 75% wt/wt $Fe_3O_4$: PEG microcapsules with fabricated diameters of 750 μm. FIG. 6 shows flow rates for forward and backward flows for (FIG. 6A) 50%, (FIG. 6B) 75% wt/wt $Fe_3O_4$: PEG microcapsules with diameters of 750 μm as flow rectifying valves. As shown in FIG. 6A, the 50% formulation provided flow rectification but only achieved a 4.2 inlet to outlet flow ratio at 14 kPa. However, the 75% formulation (FIG. 6B), demonstrated outstanding flow rectification with inlet flow of 5 μL/min and an outlet flow of less than 0.07 μL/min at 14 kPa flow pressure, a 71.4 inlet to outlet flow ratio. This enhanced performance is due to the stronger magnetic force attraction, which provides better sealing between the microcapsule wall and the tubing wall. In addition, extremely low leakage flows from backpressures at a rate of 4.7 nL/min $kPa^{-1}$ for the 75% formulation, solving one of the major challenges passive check valves face—leakage flows that might cause cross-contamination of fluids at lower pressure range. The valve successfully blocked backward flows coming from the outlet side at backpressures up to 5.5 kPa, well above biomedical implant, Lab-on-Chip, and wearable microfluidic application requirements. For example, inner ear drug delivery applications experience a backpressure characterized by the endolymphatic pressure; 0.53 kPa in guinea pigs. The valve's forward-flow opening pressure was recorded to be 2.1 kPa, satisfying our goal to achieve a passive valve under low flow rate regime. The results of FIG. 6 also demonstrate a relationship between magnetic nanoparticle concentration and forward flow rate, making this a design parameter to be tuned for the specific application.

Figure 7:
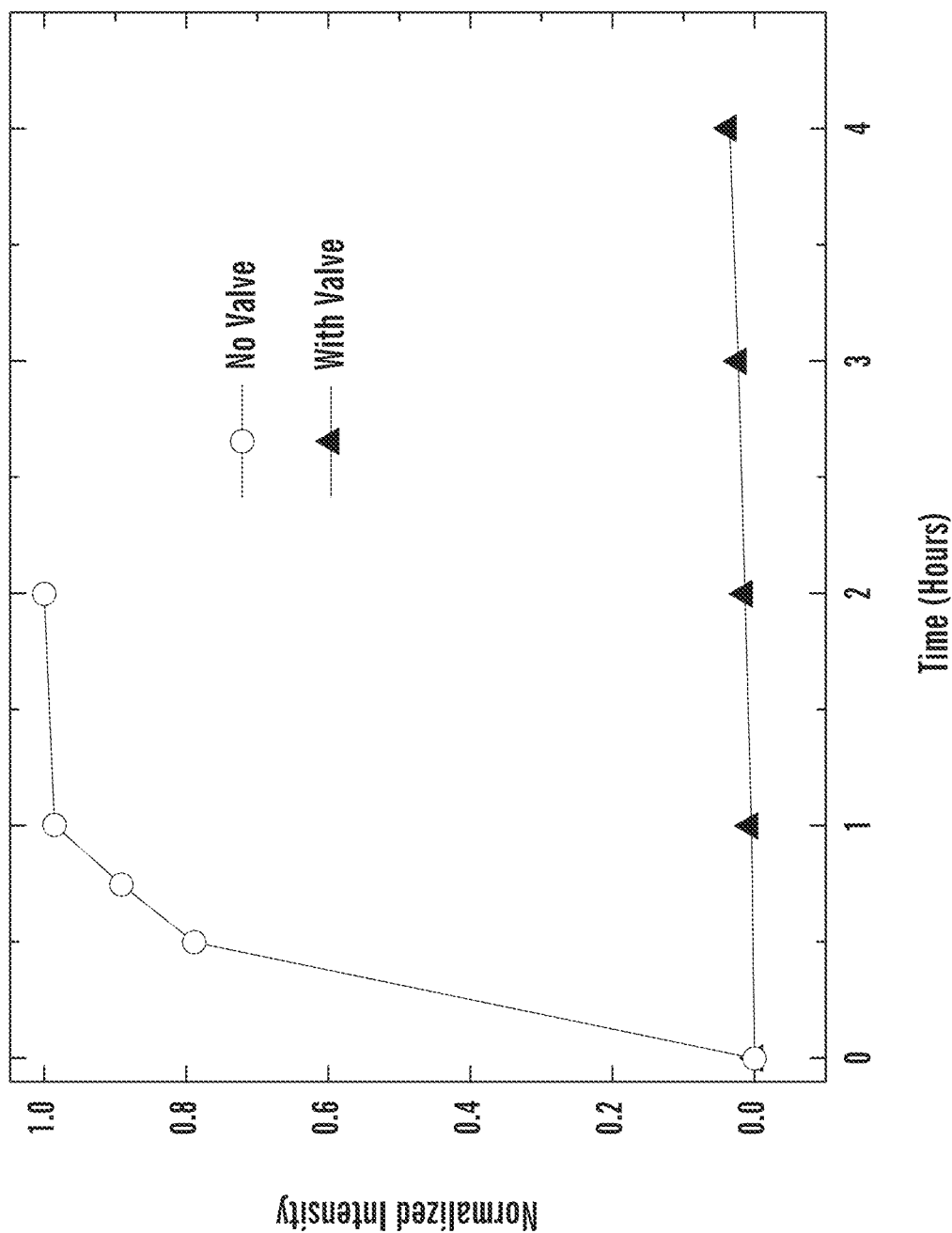
FIG. 7 is a graph of normalized intensity verses time with/without the valve demonstrating diffusion blocking capability for a fluorescent molecule.

An important feature of the presented passive valve is its ability to block diffusion in the no-flow state. Diffusion tests with fluorescence on the outlet side and fresh water on the inlet side are shown in FIG. 7. In FIG. 7 normalized intensity trends with/without the valve are compared. In the absence of the valve, the fluorescence intensity on the inlet side reached the maximal value within one hour.

As calculated, over 1 hour, the diffusion rate with the valve would be 0.04% of the diffusion rate in the absence of the valve, indicating that the valve had successfully blocked 99.96% of the diffusion for the measurement period. This demonstrates robust sealing of the microcapsule wall to the tubing wall in the no-flow state, providing a unique capability in passive valves.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A capsule comprising:
   a flexible outer shell comprising an inlet side and an outlet side capable of transforming into an asymmetric shape where the asymmetry is from the inlet side to the outlet side, wherein the flexible outer shell inlet side is free to move in response to a fluid flow; and an internal medium encapsulated by the outer shell, the medium comprising a plurality of magnetic particles, wherein the plurality of magnetic particles are capable of moving in an applied external magnetic field to transform the outer shell.

2. The capsule of claim 1, wherein the medium can transition between a solid phase and a liquid phase in which the magnetic particles can migrate.

3. The capsule of claim 1, wherein the medium is liquid and the magnetic particles can be immobilized or set free to migrate.

4. The capsule of claim 1, wherein the outer shell is water-impermeable.

5. The capsule of claim 1, wherein the medium is contained in the outer shell by polymer synthesis over the medium.

6. The capsule of claim 1, wherein the medium is contained in the outer shell by polymer deposition over the medium.

7. The capsule of claim 1, wherein the medium is contained in the outer shell by encapsulating a phase-change material molded in solid phase, wherein medium is capable of transition to liquid phase.

8. The capsule of claim 7, wherein the phase-change material is thermally degraded to permanently lower its melting point below an operating temperature of the valve.

9. The capsule of claim 1, wherein the magnetic particles comprise ferromagnetic or superparamagnetic particles.

10. The capsule of claim 1, wherein the medium comprises polyethylene-glycol.

11. A valve system comprising:
an in-line valve, sized to fit within a flow channel, and comprising a flexible capsule comprising an inlet side which is free to move in response to a fluid flow through the fluid channel and capable of transforming into an asymmetric shape having a flexible outer shell containing an internal medium encapsulated by the outer shell, the medium comprising a plurality of magnetic particles; and
a magnetic field source disposed about an exterior wall of the flow channel.

12. The system of claim 11, wherein the magnetic field source is positioned at an outlet end of the capsule.

13. The system of claim 11, wherein the magnetic field source provides a magnetic field gradient which attracts the magnetic particles.

14. The system of claim 13, wherein the magnetic particle attraction to the magnetic field source pushes the capsule outer shell against an interior wall of the flow channel providing a sealing force.

15. The system of claim 14, wherein the sealing force is adjusted based on the magnetic particles concentration, external magnetic field strength, and the flexibility of the capsule shell.

16. The system of claim 11, wherein the magnetic field source is passive.

17. The system of claim 11, wherein the magnetic field source is active.

18. The system of claim 11, wherein the magnetic particles are free to migrate within the capsule medium, and are concentrated at the outlet end of the valve.

19. The system of claim 11, wherein the capsule expands during a liquid phase to enhance sealing of the valve to the interior channel walls.

20. The system of claim 11, wherein the flow channel is a tube.

21. The system of claim 11, wherein the flow channel is a microchannel.

22. The system of claim 11, wherein the valve comprises a flow rectifier.

23. The system of claim 11, wherein the valve is a non-flow rectifier valve.

24. The system of claim 11, wherein the magnetic field source is positioned in the middle of the capsule.

25. A valve system comprising:
an in-line valve, sized to fit within a flow channel, and comprising a flexible capsule capable of transforming into an asymmetric shape having a flexible outer shell containing an internal medium encapsulated by the outer shell, the medium comprising a plurality of magnetic particles, wherein the magnetic particles are free to migrate within the capsule medium, and are concentrated at the outlet end of the valve; and a magnetic field source disposed about an exterior wall of the flow channel.

* * * * *